(12) United States Patent
Sood

(10) Patent No.: US 8,224,912 B2
(45) Date of Patent: Jul. 17, 2012

(54) METHOD AND SYSTEM FOR MAPPING ORGANIZATIONAL SOCIAL NETWORKS UTILIZING DYNAMICALLY PRIORITIZED E-MAIL FLOW INDICATORS

(75) Inventor: Manish Chandler Sood, Airmont, NY (US)

(73) Assignee: Messagemind, Inc., New York, NY (US)

( * ) Notice: Subject to any disclaimer, the term of this patent is extended or adjusted under 35 U.S.C. 154(b) by 0 days.

(21) Appl. No.: 12/931,052

(22) Filed: Jan. 22, 2011

(65) Prior Publication Data

US 2011/0173274 A1 Jul. 14, 2011

Related U.S. Application Data

(63) Continuation of application No. 12/484,017, filed on Jun. 12, 2009, now Pat. No. 7,882,191.

(60) Provisional application No. 61/061,484, filed on Jun. 13, 2008.

(51) Int. Cl.
*G06F 15/16* (2006.01)
*G06F 12/00* (2006.01)

(52) U.S. Cl. ........................ 709/206; 709/207

(58) Field of Classification Search .......... 709/206–207, 709/217–218, 225–229, 250
See application file for complete search history.

(56) References Cited

U.S. PATENT DOCUMENTS

| | | | |
|---|---|---|---|
| 7,882,191 B2 * | 2/2011 | Sood ........................... | 709/206 |
| 2004/0153512 A1 | 8/2004 | Friend ........................ | 709/206 |
| 2005/0204002 A1 | 9/2005 | Friend ........................ | 709/206 |
| 2007/0168430 A1 | 7/2007 | Brun et al. .................. | 709/206 |
| 2008/0165972 A1 | 7/2008 | Worthington ................ | 380/278 |
| 2009/0157819 A1 | 6/2009 | Hampton ..................... | 709/206 |
| 2009/0313346 A1* | 12/2009 | Sood ........................... | 709/207 |

OTHER PUBLICATIONS

Krebs, Valdis, "Managing the 21st Century Organization." International Association for Human Resources Information Management Journal 11(4): 2-8.

Boyd, Dana. "Faceted ID/Entity: Managing Representation in a Digital World," Thesis Paper, Massachusetts Institute of Technology, 2002. <<http://smg.media.mit.edu/people/danah/thesis/danahThesis.pdf>>Last accessed Jun. 13, 2008.

"Social Network Fragments" <<http://smg.media.mit.edu/Projects/SocialNetworkFragments/>>Last accessed Jun. 13, 2008.

* cited by examiner

*Primary Examiner* — Zarni Maung
(74) *Attorney, Agent, or Firm* — Richard J. Katz, Esq.

(57) ABSTRACT

A method to use dynamically prioritized email communications to establish and analyze organization social network maps includes selecting a dynamically prioritized email dataset based on network boundaries and contextual framework, establishing a one-way trusted relationship score between an email recipient and sender, establishing a one-way trusted relationship score between an email sender and recipient, establishing a two-way trusted relationship score between two communicating entities, establishing an atomic unit of entities based on a decreasing order of at least one of the one-way trusted relationship score and the two-way trusted relationship score, and establishing a social network based on arranging atomic units and entities based on one or more of an email prioritization score, a trusted relationship score, and an email productivity and collaboration metric, wherein the entities are email senders and email recipients.

20 Claims, 6 Drawing Sheets

METHOD AND SYSTEM FOR MAPPING ORGANIZATIONAL SOCIAL NETWORKS UTILIZING DYNAMICALLY PRIORITIZED E-MAIL FLOW INDICATORS

CLAIM OF PRIORITY

This application claims the benefit of priority, under 35 U.S.C. §119(e), of U.S. Provisional Application No. 61/061,484, filed Jun. 13, 2008, and titled "METHOD AND SYSTEM FOR MAPPING ORGANIZATIONAL SOCIAL NETWORKS UTILIZING DYNAMICALLY PRIORITIZED E-MAIL FLOW INDICATORS," which is hereby incorporated by reference in its entirety. This application claims the benefit of priority, as a continuation under 35 U.S.C. §120, of application Ser. No. 12/484,017, filed on Jun. 12, 2009, which issued as U.S. Pat. No. 7,882,191 on Feb. 1, 2011.

FIELD

The present invention relates to using dynamically prioritized e-mail communication for automatically mapping and analyzing social networks in an organization in real time.

BACKGROUND

Today e-mail is the most heavily used mode of business communication. According to various estimates more than 70% of the critical information being communicated resides in the body of the e-mail itself.

Social network analysis focuses on ties among, for example, people, groups of people, organizations, and countries. These ties combine to form networks. These ties matter, because they transmit behavior, attitudes, information, or goods. Organizations are fast recognizing the potential of organization social network analysis for enhancing innovation and productivity and better collaboration with teams inside as well as outside the organization (e.g., customers, vendors, research institutions, etc.). Roughly one-third of the presentations at the Academy of Management's annual meeting now have a social network perspective. However, enterprise social mapping has not yet become a mainstream decision making tool for managers.

Maps, or diagrams, which reflect social networks are called sociograms. Sociograms are a graphic representation of the social links for an individual or a collection of individuals. Analysis of a sociogram can lead to an understanding of the choices or preferences within a group. They can diagram the structure and patterns of group interactions. A sociogram can be drawn on the basis of many different criteria to diagram a group's interaction and patterns. These criteria include, but are not limited to social relations, channels of influence, lines of communication, etc.

The most challenging aspects of creating a sociogram remains collection of the data. Data collection conventionally depends on manual resources implementing complex methods, which can be extremely time and resource consuming.

There are several ways to collect data on social relations; however most of them depend on manual surveys or observations. Traditionally sociometrists focus on the structure of social choice within a group. They gather data by asking each member of a group to indicate his or her favorites (or opponents) with respect to an activity that is important to the group, or by showing each member a list of all the members of the group to choose from. These methods are called "free recall" and "roster" respectively. The respondents are generally asked to restrict their choices to two or three.

Other techniques involved "ranking" (rank all other group members with respect to their attractiveness), or "paired comparison" (choose all possible pairs of group members and choose a preferred person in each pair. However all the techniques that elicit data on social relationships through questioning are less accurate because these depend on the often inaccurate recollections of the respondents. To avoid this problem, there are other data collections techniques that register social relationships rather than elicit them. For example, the level of interaction among a group may be observed by a researcher. Although this is a more accurate approach, it is practically impossible to monitor a large group.

In *Managing the 21$^{st}$ Century Organization*, pages 1-8, International Association for Human Resources Information Management Journal, Volume XI, Number 4, 2007, by Valdis Krebs (available online at the Managing21CenturyOrganization website, last visited Jun. 13, 2008), a method is described where the client's I/T department gathered email data and provided a snapshot every month of a project. Information was gathered only from the e-mail's To: and From: fields. The Subject: line and the actual content within the body of the email were ignored. Further, data was only collected form emails addressed to individuals. Emails addressed to large distribution lists were not collected, nor made part of the snapshot. The sociogram produced from this data only drew a between two nodes if two persons sent email to each other at a weekly or greater frequency.

Research at MIT discloses implementation of social network fragments in two separate phases. See *Social Network Fragments* (available online at the Social Media Group website provided by Massachusetts Institute of Technology, last visited Jun. 13, 2008), and *Faceted ID/Entity: Managing Representation in a Digital World*, by Danah Boyd, Thesis Paper, Brown University 2001 (available online at the Social Media Group website provided by Massachusetts Institute of Technology, last visited Jun. 13, 2008). The first phase, considered the layout phase, was primarily the modification of the BuddyGraph work disclosed in *Social Network Fragments*. Modification was done so as to suit the needs of visualizing email networks in order to reveal the structural holes in the networks. The second phase, known as the visualization phase, focused on constructing an interactive visualization tool for users to explore the social data that emerged from their networks. The prior art does not consider the dynamically prioritized email communications according to a recipient's priorities and the actions on the prioritized emails by entities (email recipients and/or email senders), to establish and analyze social network maps.

SUMMARY OF THE INVENTION

In one aspect, the invention provides a method to use dynamically prioritized email communications to establish and analyze organization social network maps. The method includes selecting a dynamically prioritized email dataset based on network boundaries and contextual framework, establishing a one-way trusted relationship score between an email recipient and sender, establishing a one-way trusted relationship score between an email sender and recipient, establishing a two-way trusted relationship score between two communicating entities, establishing an atomic unit of entities based on a decreasing order of at least one of the one-way trusted relationship score and the two-way trusted relationship score, and establishing a social network based on arranging atomic units and entities based on one or more of an email prioritization score, a trusted relationship score, and an email productivity and collaboration metric, wherein the entities are email senders and/or email recipients.

DETAILED DESCRIPTION

Figure 1:
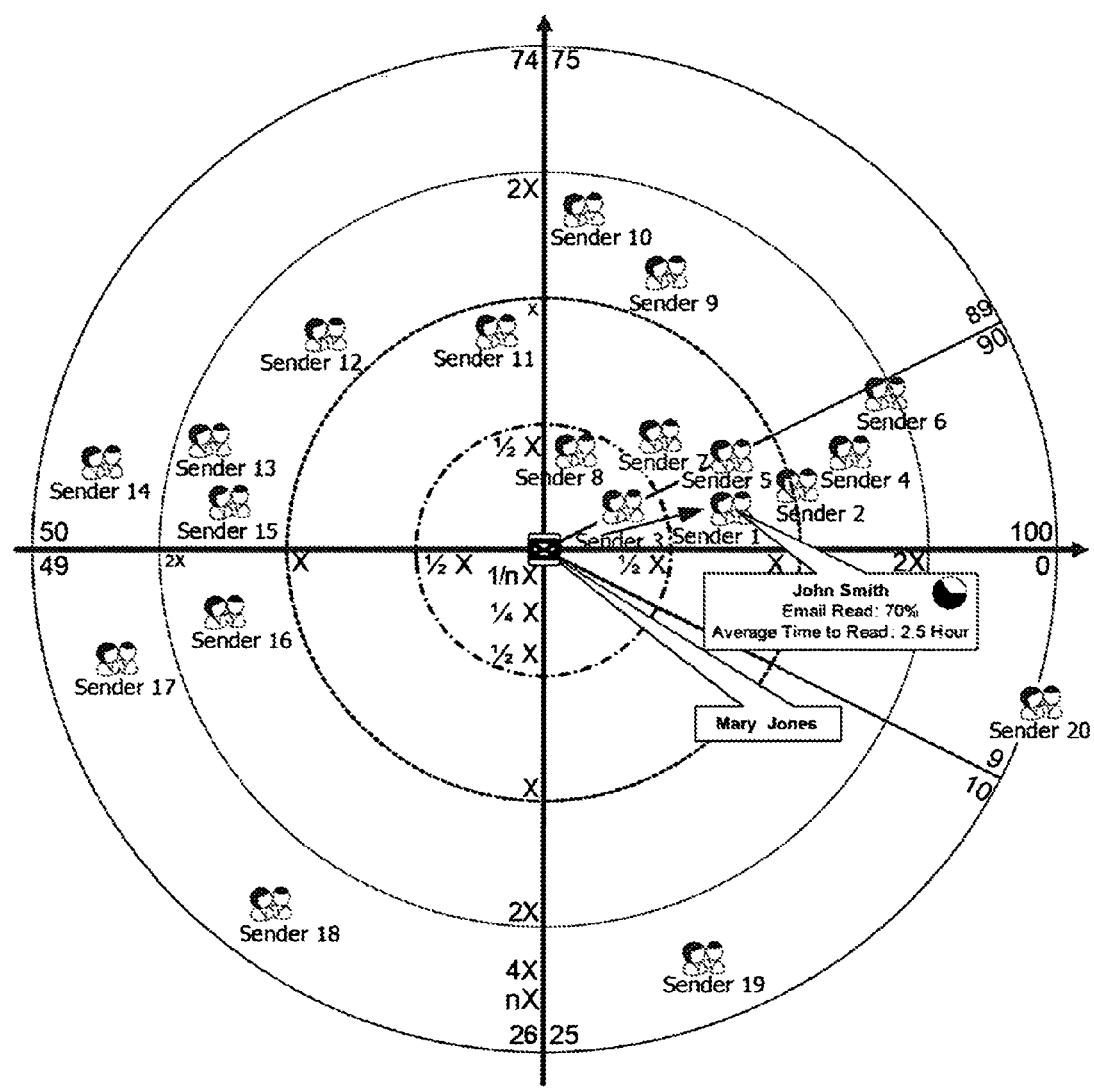
FIG. 1 is an illustration of an embodiment of the invention based on, at least in part, how recipients treat select communications.

The present invention is embodied in methods and systems which map and analyze social networks based on the analysis of dynamically prioritized email. Thus, in at least one aspect, the present invention reduces laborious manual procedures resulting in reduced costs and quicker, more timely sociograms.

Previous efforts to use e-mail communication for organization social mapping involved manual collection and manual input of all the e-mail communication data. These data collections were conducted irrespective of (1) whether the recipient or the sender considered those email communications relevant to the context of the social network; (2) did not take into effect email prioritization and productivity metrics; (3) relied on overall email volume; and (4) did not target specific social choice(s) made by either the recipient or sender based on their actions on the prioritized emails.

By way of overview and introduction of the present invention, one embodiment of the methodology and its implementation to use dynamically prioritized email communications to map and analyze organization social network is described as follows.

Step 1: Selecting the Prioritized Email Dataset Based on the Network Boundaries and Contextual Framework:

To map and analyze a social network, it is important to define its boundaries and context. By way of example, this is accomplished through one or more of the following methods:

a) Select <Users, Groups ...> (Example: Sales AND R&D AND Support NOT Human Resources): An organization may consist of one or more of individuals or groups (teams, departments, functions and processes). The social network boundary is defined by selecting the individuals or groups who will be included in the analysis. It may include the individuals or groups that directly affect the network (leaders, influencers) and others around them who are directly or indirectly influenced (connected) by them.

b) Select <Duration> (Example: 9:00 am on Jan. 1, 2008 to 9:00 am Mar. 31, 2008): A specific dataset of dynamically prioritized email communications is selected based on the selected duration.

c) Select <Subject or Keywords> (Example: "Skin Cancer DNA"): To minimize noise, the Social network is analyzed from a contextual perspective by limiting the dataset to only those dynamically prioritized email which contain the selected "keywords" or "subject lines" or "contextual relationships". A Boolean relationship option is provided to analyze network with multiple contexts and enter conditions such as AND, OR, NOT, and Exact Match.

d) Select communication with certain <Contacts>: A subset of dynamically prioritized email communications is limited to those emails that are communicated with a select person (example: jsmith@xyz.com), or a number persons (jsmith@xyz.com, mjanes@abc.com), or entities (@xyz.com, @abc.com).

e) Select Priority <Very High, High, Medium, Low, Very Low> (Example: Very High and High Priority only): The dataset is limited to only those email which are considered relevant and important by the select individuals or groups (defined by the priority score and/or priority category of the emails). The email system embodying the present invention 'learns' the recipient's priorities by analyzing his/her supervised and unsupervised feedback and then feeds that intelligence into a prioritization engine. The prioritized emails are then presented to the recipient in the decreasing order of the priority score and/or priority category. The recipient can change the priority of an email at any time or 'tell' the system what's important to him with one click. That change in priority is dynamic which means that this feedback will be communicated to the prioritization algorithms to prioritize new email and reprioritize the existing unread email according to the user's feedback. Email workflow functions and different GUI views of the prioritized emails are provided to the user to help stay focused on his/her priority emails, identify and read high priority email first, identify actionable emails, plan actions, and complete prioritized actions on the actionable emails. With the above processes in place, the user accurately validates and accepts the priority score and category of the emails.

Figure 4:
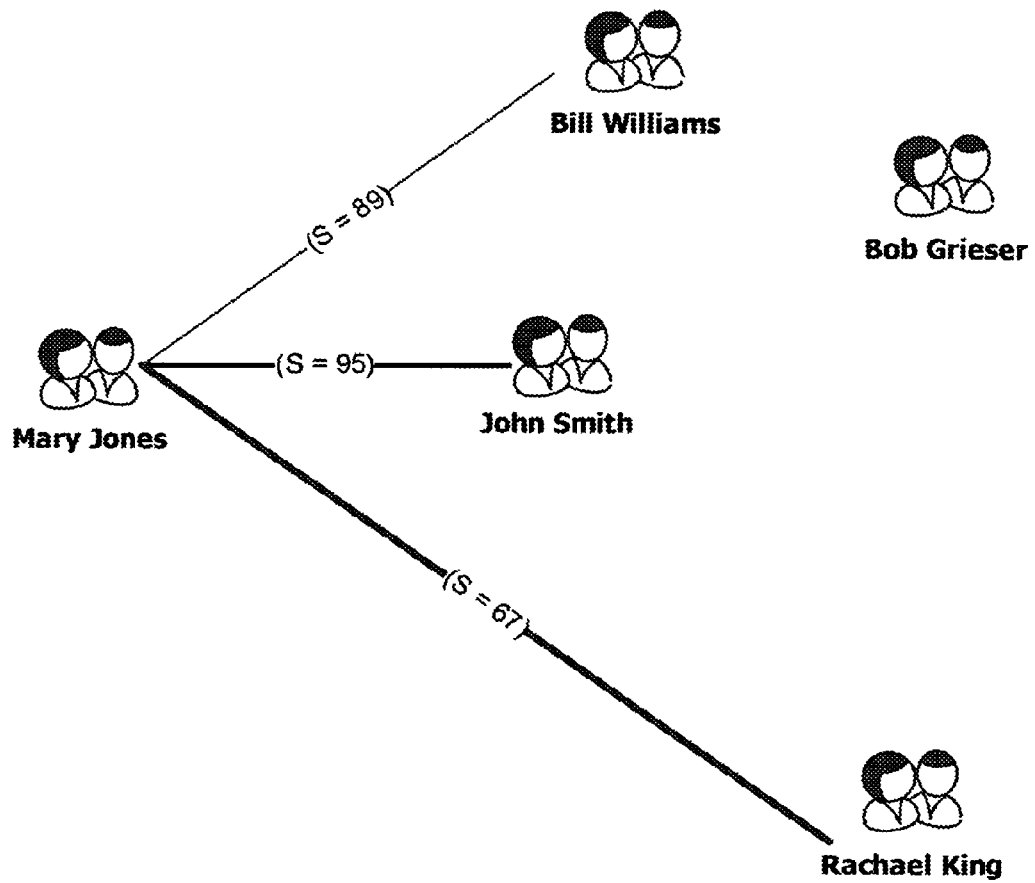
FIG. 4 is an illustration of still another embodiment of the invention that, at least in part, establishes an atomic units between at least two entities.

In one embodiment, a user's actions on emails that are dynamically scored 50 or higher (on a priority scale of 1 to 100, 100 being the highest priority), and the priority of the emails is already validated and accepted by the user, are the valid dataset for analyzing the trusted relationships. However, in another embodiment the analysis may be performed on all the prioritized email to measure strengths or weaknesses in the network.

f) Maximum Number of Trusted Relationships <2, 3, 4 ...> (Example: 3): This will decide how many maximum top trusted relationships should be selected for a given individual (called "entity" or "actor"). For example, if "3" is selected there can be maximum 3 spokes (three trusted relationships) attached to one hub (individual/entity/actor) as shown in FIG. 4. (Mary connected to Bill, John, and Rachael). One embodiment includes measuring the top trusted relationships based on one or more of the dynamic priority score, productivity metrics, and collaboration metrics taken from the selected dataset of the dynamically prioritized email communication.

g) Remove/Add Entities (Example: Remove John Smith, Add Mary Jones): An atomic unit of social structure is one where the members share positive attitudes and relations on a given subject. For example, a group may agree or like each other on the subject of "salary increase," but the same group may disagree or dislike each other on the subject of "cost cutting". Although dynamically prioritized email consider the contextual relation of the email, productivity and collaboration metrics may take into consideration negative relations between the group (as further explained in the steps 2 to 6). A further embodiment involves providing an option to the user to dynamically update the social network by removing or adding individuals (or entities) in his/her trusted network. In another embodiment this contextual social network feedback from the user can be utilized to dynamically prioritize email and update prioritization, productivity and collaboration algorithms. In another embodiment, the user may select to remove certain email communications from the social network analysis if he/she feels that that specific dataset of email is sensitive or personal. The user may also chose to limit the dataset to only those emails that are communicated within a particular department, within the entire company, or only those emails that are communicated with the people outside the company, or a combination thereof.

Step 2: Method of Establishing One-Way Trust Relationship Strength from an Email Recipient to His/Her Email Senders (Refer FIG. 1)

The One-Way trusted relationship strength is calculated on a scale of 1 to 100 (100 being the highest strength of the trusted relation) based on a combination of one or more of email prioritization score, productivity metrics and collaboration metrics, on a unidirectional basis from an email recipient to the email sender, as explained below:

a) Time to Read Dynamically Prioritized Emails: Time to Read is the time difference between email received time and email read time. In another embodiment, Time to Read takes into consideration user away from his desk or vacation, and when does the user actually work on emails based on the mouse clicking or presence detection technologies or calendar entries.

In one of the embodiments, Senders (Refer FIG. 1, John Smith, Sender 1, 2, ... to 10) falling in the high priority email zone (Priority Score 76-100) and inside the ½ Radius Circle that is their time to read by the recipient is equal to or less than one-half the recipient's average time to read all email (Refer FIG. 1, John Smith, Sender 2, 3, 5, 7, 8), are considered stronger one-way trusted relationships by the recipient (Refer FIG. 1, Mary Jones is the recipient in this case, at the center of the circle). The strength of the trusted relationship between a recipient and a sender, therefore is measured by the relative distance from the center (Recipient is at the Center, for example: Mary Jones) and the relative average of the priority score of the email communications (within the boundary dataset as defined in step 1). For example, in FIG. 1, Mary Jones trusts John Smith the most, as Mary Jones considers the email received (on the related to the selected context, and boundary conditions defined in step 1) from John Smith as the highest priority within the group and reads those email faster than her average time to read all email. Top trusted relations in the order of the strength of the relationship, are selected for further analysis.

In another embodiment, the strength of the one-way trusted relation of a recipient with a sender is the strongest (that is the relationship strength from recipient to sender is 100, on a scale of 1 to 100) when the recipient's average time to read emails from the sender is the shortest as compared to the other senders, and the average priority score of the emails received in the recipient's mailbox from the sender is the highest as compared to the other senders.

Conversely, the strength of the one-way trusted relation of a recipient with a sender is the weakest (that is the relationship strength from recipient to sender is 0) when the recipient's average time to read emails from the sender is the longest as compared to the other senders, and the average priority score of the emails received in the recipient's mailbox from the sender is the lowest as compared to the other senders.

b) Time to Reply to the Dynamically Prioritized Email: Time to Reply is the time difference between email received time and email reply time. In another embodiment, Time to Reply takes into consideration user away from his desk or vacation, and when does the user actually work on emails based on the mouse clicking or presence detection technologies or calendar entries.

The strength of the trusted relationship between a recipient and a sender is measured by the relative time to reply and the relative average of the priority score of the email communications (within the boundary dataset as defined in step 1).

In another embodiment, the strength of the one-way trusted relation of a recipient with a sender is the strongest (that is the relationship strength from recipient to sender is 100, on a scale of 1 to 100) when the recipient's average time to reply emails to the sender's emails is the shortest as compared to the other senders, and the average priority score of the emails received in the recipient's mailbox from the sender is the highest as compared to the other senders (within the boundary dataset as define in step 1).

Conversely, the strength of the one-way trusted relation of a recipient with a sender is the weakest (that is the relationship strength from a recipient to a sender is 0, on a scale of 1 to 100) when the recipient's average time to reply emails to the sender's emails is the longest as compared to the other senders, and the average priority score of the emails received in the recipient's mailbox from the sender is the lowest as compared to the other senders (within the boundary dataset as defined in step 1).

c) Percent Read of Dynamically Prioritized Email: Percent Read is defined as what percent of the number of email received is read by the recipient. The strength of the trusted relationship between a recipient and a sender is measured by the relative % Read and the relative average of the priority score of such emails (within the boundary dataset as defined in step 1).

In another embodiment, the strength of the one-way trusted relation of a recipient with a sender is the strongest (that is the relationship strength from recipient to sender is 100, on a scale of 1 to 100) when the recipient's % Read of the sender's emails is the highest as compared to the other senders, and the average priority score of the emails read by the recipient from the sender is the highest as compared to the other senders (within the boundary dataset as define in step 1).

Conversely, the strength of the one-way trusted relation of a recipient with a sender is the weakest (that is the relationship strength from recipient to sender is 0, on a scale of 1 to 100) when the recipient's % Read of the sender's emails is the lowest as compared to the other senders, and the average priority score of the emails read by the recipient from the sender is the lowest as compared to the other senders (within the boundary dataset as defined in step 1).

Those proficient in art will appreciate that a different types of statistical and probabilistic analysis can be performed to measure the trusted relationship between two entities (receiver entity and sender entity), by relatively comparing the recipient's other productivity and collaboration email metrics (such as volume of email read, volume of email replied, volume of email marked as To-Do, volume of email marked as complete, time to complete, etc.) with a particular sender, as the recipient naturally work with his/her dynamically prioritized email (prioritization already approved and accepted by the recipient), and the dynamic priority score of such emails (within the boundary dataset as defined in step 1).

The method of establishing One-way Relationship, FIG. 1, is based on how the Recipient (at the center) treats select communications (around a given context as defined by the network boundary selection) sent to him by Top Senders (arranged in order of average priority score of the selected communications assigned by the Recipient) in a given time duration (as defined by the network boundary selection).

Priority Score: V. High=100-90; High=89-75; Medium=74-50; Low=49-25; V. Low=24-10; Someday=9-0

Angle (in degrees)=−(3.6)×Priority score

R=Radius of the circle

X=Overall Average Time to Read (Based on total email received by the Recipient)

T=Average time to Read email from a given sender (sender 1, sender 2, . . . sender 20)

If T=X then ½R; if T=2X then ¾R; if T=½X then ¼R, etc.

Network Boundaries

Duration: From <MM DD YY> To <MM DD YY>; Select: <Thread/Key Words>; Priority: <V High/High/ . . . Someday>; Max # of Relationships <2, 3, 4, . . . >; Remove Entities <Sender 1, 2, . . . >

Step 3: Method of Establishing One-Way Trusted Relationship Strength from an Email Sender to His/Her Intended Recipients of the Email (Refer FIG. 2)

The One-Way Relationship Strength is calculated on a scale of 1 to 100 (100 being the highest strength of the trusted relation) based on a combination of one or more of email prioritization score, productivity metrics and collaboration metrics, on a unidirectional basis from an email sender to the email recipient, as explained below:

a) Time to Read Dynamically Prioritized Emails

Recipients (Refer FIG. 2, John Smith, Recipient 2, 3, 4 . . . to 8) who consider the email from a given sender (Refer FIG. 2, Mary Jones in this case) high priority (Priority Score 76-100) and read it faster than their respective average time to read all emails (Refer FIG. 2, John Smith, Recipient 3, 5) are considered to have stronger one-way trusted relationship with the Sender (Mary Jones). The strength of the relationship therefore is measured by the distance from the center (Sender is at the Center, for example: Mary Jones) and the average of the priority score of the email communications perceived by the recipients (within the boundary dataset as defined in step 1).

Figure 2:
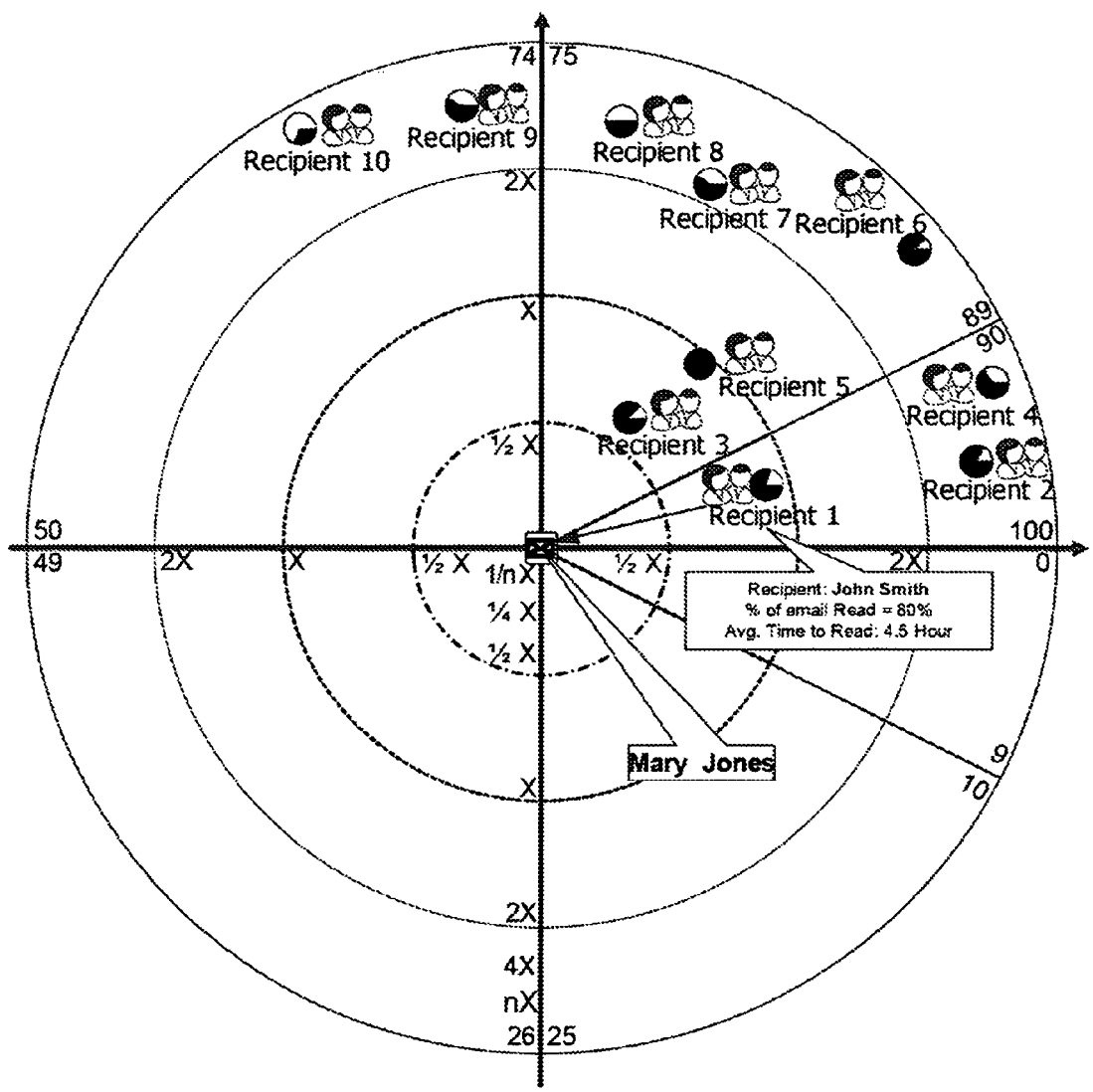
FIG. 2 is an illustration of another embodiment of the invention based on, at least in part, how top recipients treat select communications.

For example, in FIG. 2, John Smith trusts Mary Jones the most, as John Smith considers email (on the related to the selected context, and boundary conditions) from Mary Jones as the highest priority within the group and reads those email faster than the his/her (John Smith) average time to read all email and/or faster than the group's average time to read the email. Top trusted relations in the order of the strength of the relationship, are selected for further analysis.

The strength of the one-way trusted relation of a sender with a recipient is the strongest (that is the relationship strength from a sender to a recipient is 100, on a scale of 1 to 100) when the recipient's average time to read emails from the sender is the shortest as compared to the other senders, and the average priority score of the emails received in the recipient's mailbox from the sender is the highest as compared to the other senders.

Conversely, the strength of the one-way trusted relation of a sender with a recipient is the weakest (that is the relationship strength from a sender to recipient is 0, on a scale of 1 to 100) when the recipient's average time to read emails from the sender is the longest as compared to the other senders, and the average priority score of the emails received in the recipient's mailbox from the sender is the lowest as compared to the other senders.

b) Time to Reply to the Dynamically Prioritized Email

The strength of the trusted relationship between a sender and a recipient is measured by the relative time to reply and the relative average of the priority score of the email communications (within the boundary dataset as defined in step 1). The method to derive the strength of the relationship is the same as defined in Step 2 part b.

c) Percent Read of Dynamically Prioritized Email:

The strength of the trusted relationship between a sender and a recipient is measured by the relative Percent Read and the relative average of the priority score of the such emails (within the boundary dataset as defined in step 1). The method to derive the strength of the relationship is the same as defined in Step 2, part c.

Those proficient in art will appreciate that different types of statistical and probabilistic analysis can be performed to measure the trusted relationship between two entities (sender entity and receiver entity), by relatively comparing a particular recipient's other productivity and collaboration email metrics (such as volume of email received, volume of email read, volume of email replied, volume of email marked as To-Do, volume of email marked as complete, time to complete, etc.), as the recipient naturally work with his/her dynamically prioritized email (prioritization already approved and accepted by the recipient), along with the dynamic priority score of such emails (within the boundary dataset as defined in step 1).

The method of establishing One-way Relationship, FIG. 2, is based on how a set of top Receivers (arranged in order of average priority score of the selected communications assigned by the receivers) treat the select communications (around a given context as defined by the network boundary selection) sent by a Sender (at the center) in a given time duration (as defined by the network boundary selection)

Priority Score: V. High=100-90; High=89-75; Medium=74-50; Low=49-25; V. Low=24-10; Someday=9-0

Angle (in degrees)=−(3.6)×Priority score

R=Radius of the circle

X=Overall Average Time to Read (Based on total email received by all the recipients)

T=Average Time to Read of a particular Recipient (Recipient 1, Recipient 2, . . . Recipient 10)

If T=X then ½R; if T=2X then ¾R; if T=½X then ¼R, etc.

Network Boundaries

Duration: From <MM DD YY> To <MM DD YY>; Select: <Thread/Key Words>; Select: <Group, Department, Unit>; Priority: <V High/High/. . .Someday>; Max # of Relationships <2, 3, 4, . . . >; Remove Entities <Recipient 1, 2, . . . >

Step 4: Method of Establishing Two-Way Trusted Relationships (Refer FIG. 3)

The Two-way trusted relationship (email receiver and email sender) strength between two entities is calculated on a scale of 1 to 100 (100 being the highest strength of the two-way trusted relation) based on a combination of one or more of email prioritization score, productivity metrics and collaboration metrics, on a bidirectional basis between the two communication entities, as explained below.

If two entities (receiver and sender) mutually trust each other (as described in Step 2 and Step 3), a mutual trust relationship may be established. This forms the basis to form the most basic unit of social network (referred to as "Atomic Unit").

The strength of the mutual relationship is based on the average of the one way trusted relationship score between the two entities (trust relationship score from the recipient to the sender as calculated in step 2, and trust relationship score between the given sender and the given recipient as calculated in step 3) of all the select email communicated between the entities on a given context (and with in other boundary conditions as defined in step 1). In another embodiment, the minimum threshold trust score for one-way relationship has to be, for example, about 50 or more (on a scale of about 1 to about 100, 100 being the strongest relationship) for a two-way relationship score to occur. In another embodiment, the two-way trusted relationship score is a weighted average of the one-way trusted relationship scores based on the volume of high priority emails (prioritization score 75 or higher) exchanged between the two entities.

Figure 3:
FIG. 3 is an illustration of yet another embodiment of the invention that, at least in part, establishes two-way relationships between two entities.

The method of establishing Two-way Relationship between two entities, FIG. 3, if both the conditions [condition 1 (refer FIG. 1) and condition 2 (refer FIG. 2)] are TRUE for the same network boundary conditions.

Strength of the Relationship (relative distance between the two entities) is based on the average priority score of the contextual communications exchanged in the given time frame (as defined by the same network boundary conditions as that of condition 1 and 2)

Priority Score: V. High=100-90; High=89-75; Medium=74-50; Low=49-25; V. Low=24-10; Someday=9-0

L=Strength of Relationship (Distance between the two entities connected via two-way relationship)

LM=Maximum Strength of Relationship (Closest Distance between the two entities connected via two-way relationship)

LL=Lowest Strength of Relationship (Largest Distance between two entities connected via two-way relationships)

Average Priority Score=S

If S=100, then L=LM; If S=1, then L=LL; If S=0, then L=Infinite (no relationship)

Network Boundaries

Duration: From <MM DD YY> To <MM DD YY>; Select: <Group, Department, Unit, etc.>; Select: <Thread/Key Words>; Priority: <V High/High/. . . Someday>; Max # of Trusted Relationships <2, 3, 4, . . . >; Remove Entities <Person 1, Person 2, Group 1, Group 2, etc. . . . > (user may remove entities).

Figure 5:
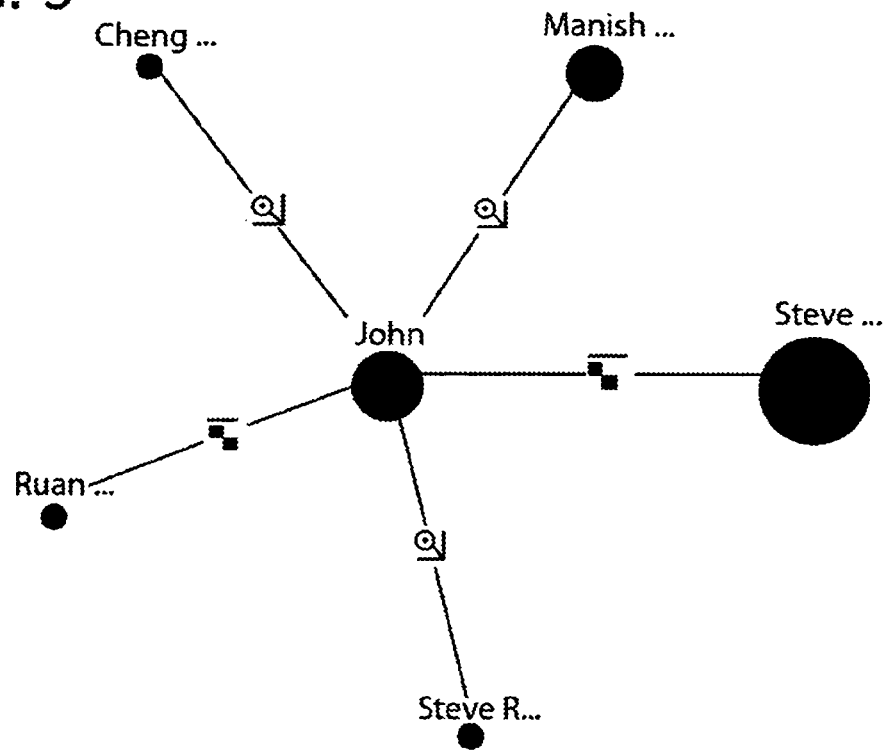
FIG. 5 is an illustration of an embodiment of the invention that, at least in part, establishes an atomic unit between at least two entities based on one-way relationship.

Step 5: Method of Establishing Atomic Unit (Refer FIGS. 4 and 5)

Top trusted relationships in the order of the strength of the trusted relationship (in the decreasing order of the trust score) are selected and are plotted to form an atomic unit.

a) Method of Establishing Atomic Unit for Two-Way (Bi-directional) Relationships Based on the Relationship Score (Refer FIG. 4):

The strength of the two-way relationship (trust score of the two way relationship on a scale from 1 to 100) can be graphically displayed by the distance between the two entities. The stronger the mutual trust (i.e. higher the mutual trust score), the closer the entities are located to each other.

The method of establishing Atomic Units, FIG. 4, (minimum 2 entities required) for given network boundary conditions. In this figure, Mary Jones has only three trusted relationships (Bill, John and Rachael). Mary and Bob have no relationship.

At the center of the atomic unit (hub) is the select person or entity for which the relationships are being analyzed (Mary Jones). The spokes consist of top trusted relationships (in this case, Bill Williams, John Smith and Rachael King) in which the length of the spoke is based on the strength of the relationship (refer Step 4) and the color of the spoke is based on the average priority score (for example: spoke between Mary Jones and John Smith is shown in red color, as this pair considers mutually considers the communication on the given context very high priority, and henceforth have share the attitude and feelings which results in the most trusted relationship (hence the closest than the other individuals—Bill Williams and Rachael King).

Strength of the Relationship (relative distance between the two entities) is based on the average priority score of the contextual communications exchanged in the given time frame (as defined by the given network boundary conditions). Also for the simplicity, the relationships are drawn using straight lines instead of bi-directional arrows. Bob and Mary have no relationship (no lines).

The lines are color coded (for example: Red for priority scores 100-90, Blue for priority score 89-75, Green for priority score 74-50).

The thickness of the lines is based on the number (volume) of communication exchanged between two entities. For example: Mary and Rachael communicate heavily between them Vs Mary and Bill, although the discussions between former pair is considered less important (S=67) than the discussion between later pair (S=89).

Priority Score: V. High=100-90; High=89-75; Medium=74-50; Low=49-25; V. Low=24-10; Someday=9-0

L=Strength of Relationship (Distance between the two entities connected via two-way relationship)

LM=Maximum Strength of Relationship (Closest Distance between the two entities connected via two-way relationship)

LL=Lowest Strength of Relationship (Largest Distance between two entities connected via two-way relationships)

Average Priority Score=S

If S=100, then L=LM; If S=1, then L=LL; If S=0, then L=Infinite (no relationship).

Network Boundaries

Duration: From <MM DD YY> To <MM DD YY>; Select: <Group, Department, Unit, etc.>; Select: <Thread/Key Words>; Priority: <V High/High/. . . Someday>; Max # of Trusted Relationships <2, 3, 4, . . . >; Remove Entities <Person 1, Person 2, Group 1, Group 2, etc. . . . > (user may remove entities).

b) Method for Establishing Atomic Unit for One-Way (Unidirectional) Relationships Based on the Relationship Score (Refer FIG. 5):

The strength of the one-way relationship (unidirectional trust score from one entity to another) can be shown by the size of the bubble. The stronger the one-way trust (e.g., the higher the one way trust score, on a scale of 1 to 100), the bigger the size of the bubble.

At the center of the atomic unit (hub) is the select person or entity (John) for which the one-way relationships are being analyzed. The spokes consist of top trusted relationships (in this case, Manish, Steve, Steve R, Ruan, Cheng) in which the size of the bubble is based on the strength of the relationship from John to Manish, John to Steve, John to Steve R, John to Ruan and John to Cheng. As you will notice, John trusts Steve the most as Steve's bubble size is the biggest in the group.

Step 6: Method of Establishing Social Network (Refer FIGS. 6 and 7)

Atomic units for One-way (unidirectional) relationships for a specific context and boundary conditions (steps 1 to 5) are arranged to form a social network map.

Figure 6:
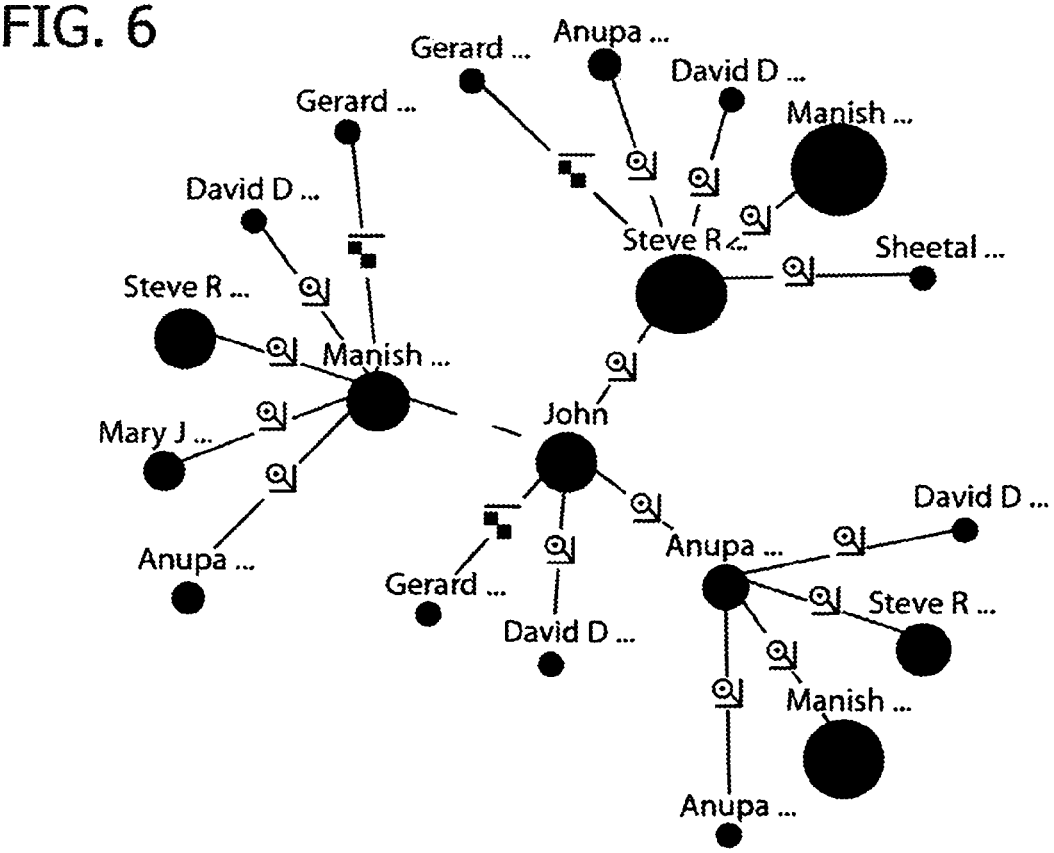
FIG. 6 is an illustration of embodiment of the invention that, at least in part, establishes a social network map based on arranging the atomic units.

An illustration of the embodiment is displayed in FIG. 6. John is at the hub of the social network, and John's top 5 one-way trusted entities (based on the trusted score from John to the entities for the selected context and boundary conditions) are displayed as bubbles connected to John. John's top 5 trusted entities are Steve R, Anupa, David D, Gerard and Manish, also referred to as the "first level" of the network. The size of the bubble is based on the strength of the one-way trust from John to the respective entity (notice the bubble size for Steve is the largest among John's top 5). As shown in the example of FIG. 6, John trusts Steve the most on the given context (but Steve may or may not trust John the most). Then at the second level of the network, top 5 one-way trusted entities are displayed for each of the entities at the first level of the network. In the example shown, Steve's top 5 one-way trusted entities (based on the trusted score from Steve to the entities for the selected context and boundary conditions) are displayed as bubbles connected to Steve. Steve's top 5 trusted entities are Gerard, Anupa, David D, Manish and Sheetal. Steve trusts Manish the most on the selected context (Manish's size of the bubble is the highest among Steve's top 5). You will also notice that John is not among the top trusted entities of Steve (although Steve is among John's top 5 trusted entities).

A social network map is established based on a combination of average priority score of the emails dataset for a specific context and the boundary conditions (refer step 1 to 5), volume of the emails, one or more attributes of the entity (such as the entity is an employee of the organization, or is external to the company). In another embodiment, the quality of the communication within the network, or between one entity and another entity, or between one entity and the entire network, is displayed based on a combination of email volume exchanged on a given "subject" and the average prioritization score/prioritization category of the emails.

An illustration of the embodiment is displayed in FIG. 7. The boundary conditions and the context, is selected by:

a) Select <Users, Groups . . . >: [R&D Department]. User can click on "Select Users/Mailboxes" button and select the desired boundary in terms of selecting various individuals, groups, or departments whose emails will be analyzed. For example, a dataset of dynamically prioritized emails from the mailboxes of all the users in the R&D Department are selected for analysis.

b) Select <Duration>: [From: 01/02/2009 to: 01/09/2009]. A specific dataset of dynamically prioritized email communications in this duration is selected.

c) Select <Subject or Keywords>: [Oncology]. The dataset of emails is limited to those dynamically prioritized email which contain the keyword "oncology." Related keywords (such as "cancer") can be suggested to the user to be added or automatically added in the contextual criteria.

d) Select communication with certain <Contacts>: [@columbia.edu]. A subset of dynamically prioritized email communications is limited to those emails that are communicated with @columbia.edu domain (i.e. email received from or sent to anyone at Columbia).

e) Select <Priority>: [Very High and High]. The dataset is limited to only those email whose priority category is High or Very High (or priority score 75 and 100).

f) Maximum Number of Trusted Relationships>: [5]. A maximum if top 5 trusted relationships is selected to be displayed for each "entity."

g) Remove/Add Entities: Once the social network map is generated, a user can right-click on any of the bubbles and remove the entity from his social network work results or further social network analysis. For example (refer FIG. 6), if John chooses to remove Steve R from his top 5 analysis and executes the analysis again, John's next trusted entity (6th highest trusted score rank) will replace Steve R. Similarly John can refine the analysis until he is satisfied with his top 5. One-click functions are provided so that Steve can also request his manager to remove someone permanently from the social network map (say someone who has left the company), or mark any of his trusted entities to "private" so other people could not see that person as one of Steve's atomic unit (top trusted entities of Steve).

Upon executing the analysis (steps 1 to 6), social network maps and related information is displayed as shown in FIG. 7.

Figures 7A, 7B, 7C, 7D:
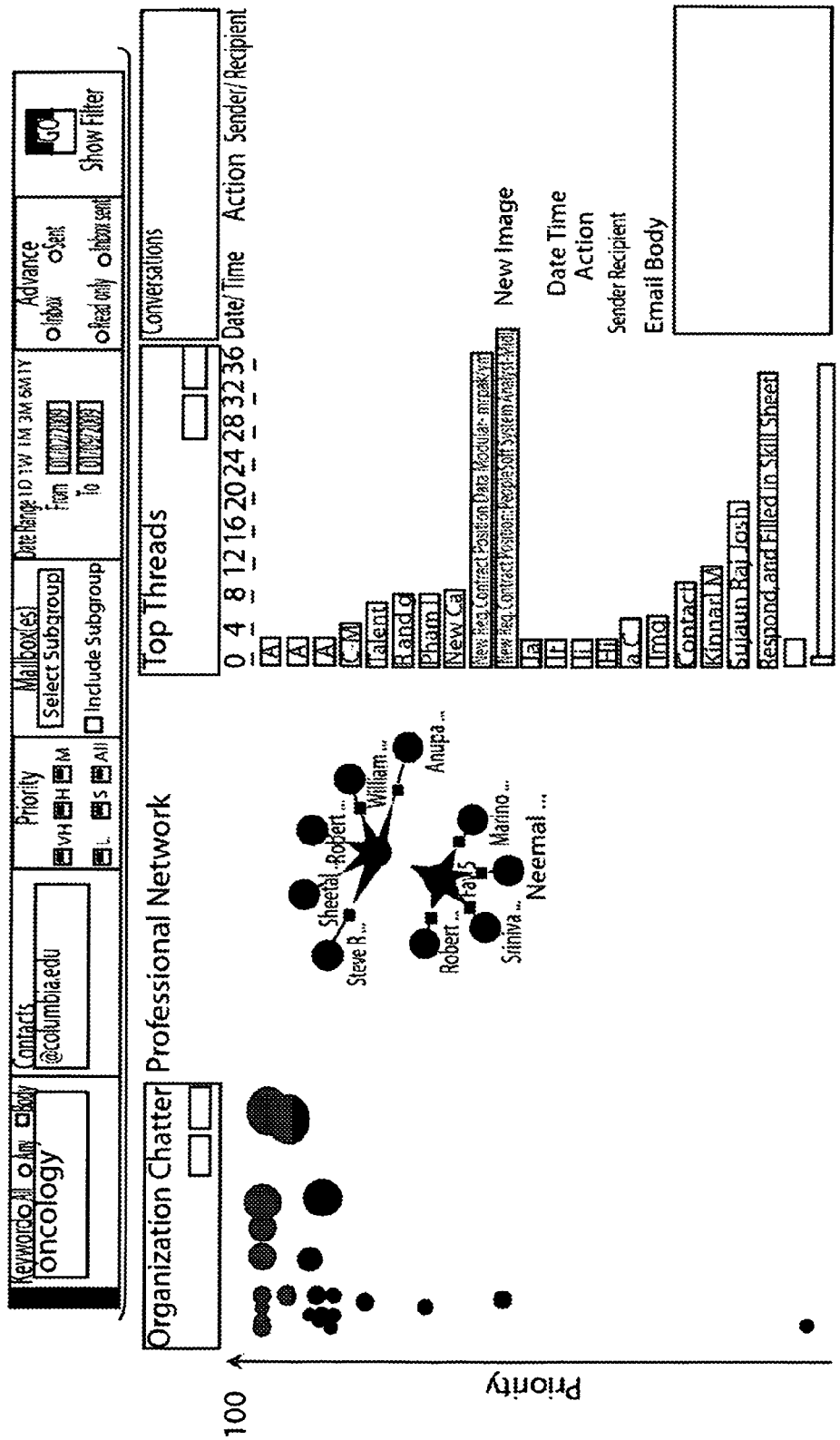
FIGS. 7A-D is an illustration of an embodiment of the invention that, at least in part, establishes a social network map based on an email prioritization score, trusted relationship strength score, and productivity and collaboration metrics, with the specified contextual and boundary conditions.

Refer to the Organization Chatter graph (FIG. 7A). The Y-axis is the prioritization score, the X-Axis in the size of the bubble. The size of the bubble is established based on one or more of the following: trust score (two-way or one-way), email productivity, and email collaboration metrics of the entity's with the rest of the entities. The color of the bubble is based on the department, location or whether the person is internal or external to the company.

The Professional Network graph (FIG. 7B) illustrates another embodiment of plotting social network map in which the atomic unit of top trusted entities are established for a given contextual keyword or a set of keywords based on one or more of the following: (1) relationship trust score (two-way or one-way), (2) email productivity score, and (3) email collaboration metrics of an entity with the rest of the entities within the social network. In the example shown, FIG. 7, top 5 trusted entities among the network for the keyword "oncology" (and who interact with Columbia University@columbia.edu) are displayed at the first level of the network. As depicted, Robert, Sriniva, Neemal, Marino and Manish are top 5 experts for the keyword "Oncology" (and who interact with Columbia University). Then the second level of the network is displayed wherein top 5 trusted entities (one-way relationship from Manish to the entity) of each of the entity on the first level of the network are displayed. For example, Manish (level 1) top 5 trusted entities for the context keyword "Oncology" are Steve R, Sheetal Robert, William, and Anupa.

Refer to the Top Threads (FIG. 7C). Top active email threads in the order of the volume and the priority score and/or priority category, that are exchanged among the social network are displayed. The user (depending upon his access rights and company's policies) may have an ability to drill down each thread to see individual email being exchanged (FIG. 7D). In another embodiment, user can simply scroll over the spoke or click on a bubble to narrow down the email threads that are exchanged between the select entity with its atomic unit or the select entity with the rest of the social network.

In an enterprise environment security, privacy and legal policies can be established by one or more of the following:

Controlling the access rights of the user (e.g. CEO of a company can see the social network of the entire company, where as a sales head can only see the social network of only those people who are in his department. A user cannot see the trusted entities of his boss or any superior etc)

Controlling the contextual keywords (e.g., users can only select those keywords that are pre-approved by the management. For example, user can generate a social network map around "oncology" but they cannot enter a keyword say "mergers and acquisitions for 2009".

User Opt-out: A user can opt out of the social network and will not be included in the display results.

Marking contacts and emails private: A user can mark some emails "private". Those emails will be excluded from the dataset to be analyzed. Similarly a user can mark a contact private (say "spouse" email address), so those entities and any email communicated with those entities will be excluded from the dataset to be analyzed.

Excluding emails that are considered to be "sensitive", "confidential", "deleted" or involved in "litigation".

Those proficient in art will appreciate that this analysis can be performed for one or more contexts, the number of entities can vary (in the above example: it is top 5 relationships), and the boundary conditions can span across departments, inside and across organizations and countries. Moreover the analysis is not just limited to electronic communication such as email, fax, instant messaging or blogs but can also be applied for other type of communications such as in person or virtual meetings, phone conversations, and video conferencing.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

The invention claimed is:

1. A method to use dynamically prioritized electronic communications to establish and analyze organization social network maps, the method comprising the steps of:
    selecting a dynamically prioritized electronic communication dataset based on network boundaries and contextual framework;
    establishing a one-way trusted relationship score between an electronic communication recipient and sender;
    establishing a one-way trusted relationship score between an electronic communication sender and recipient;
    establishing a two-way trusted relationship score between two communicating entities;
    establishing an atomic unit of entities based on a decreasing order of at least one of the one-way trusted relationship score and the two-way trusted relationship score;
    establishing a social network based on arranging atomic units and entities based on one or more of an electronic communication prioritization score, a trusted relationship score, and an electronic communication productivity and collaboration metric;
    establishing top trusted entities for a given keyword or a set of keywords;
    establishing a secondary trusted network of entities for at least one of the top trusted entities based on the given keyword or the set of keywords; and
    wherein the entities are electronic communication senders and electronic communication recipients.

2. The method of claim 1, wherein respective relationship scores between two entities for a particular context, is established based on at least one of a prioritization score and a priority category of a dynamically prioritized electronic communication related to the given context, wherein the dynamically prioritized electronic communication is exchanged between the two entities in a select duration and a boundary condition.

3. The method of claim 2, wherein the priority score or category of the electronic communication is validated and accepted by an electronic communication recipient.

4. The method of claim 2, further comprising the steps of measuring a productivity metric and a collaboration metric of the dynamically prioritized electronic communication.

5. The method of claim 4, further including at least one of:
    comparing a recipient's time-to-read an electronic communication received from a first sender for a first context with the recipient's time-to-read for electronic communications received from other senders for the first context, wherein the time-to-read is an elapsed time between electronic communication receipt and read;
    comparing a recipient's time-to-reply to an electronic communication received from a second sender for a second context, with the recipient's time-to-reply to electronic communications received from other senders for the second context, wherein the time-to-reply is an elapsed time between electronic communication receipt and reply; and
    comparing a recipient's percent-of-electronic-communications-read for a plurality of electronic communications received from a third sender for a third given context with the recipient's percent-of-electronic-communications-read for a plurality of electronic communications from other senders for the third context;
    wherein the percent-of-electronic-communications-read is a percent of electronic communications read out of electronic communications received.

6. The method of claim 4, further comprising the step of weighting the productivity and collaboration metrics according to an average prioritization score of an electronic communication exchanged among multiple entities.

7. The method of claim 4, further including the step of calculating metrics including at least one of a volume of electronic communication received, a volume of electronic communication read, a volume of electronic communication replied, a volume of electronic communication marked as a to-do action item, a volume of actionable email electronic communication marked as complete, and a time to complete an action.

8. The method of claim 1, wherein the pre-condition to input an electronic communication dataset may be that the priority score of the electronic communication exceeds a minimum priority score of about 50 on a scale of about 1 to about 100, 100 being the highest prioritization score to the recipient.

9. The method of claim 1, further comprising the step of displaying a quality of a communication within the network between at least one entity and at least a second entity, wherein the communication quality is based on a combination of an electronic communication volume exchanged on a particular subject and an average prioritization score/prioritization category of the particular subject.

10. The method of claim 1, further comprising the step of inputting a dataset of dynamically prioritized electronic communications containing desired contextual at least one keyword in one of a body and a subject of an electronic communication.

11. The method of claim 1, further comprising the step of inputting a dataset of dynamically prioritized electronic communications received or sent to a certain set of electronic communication addresses or electronic communication domains.

12. The method of claim 1, further comprising the step of inputting a dataset of dynamically prioritized electronic communications belonging to certain users.

13. The method of claim 1, wherein one or more of a top trusted entity is removed from the social network map and is automatically replaced by other entities in order of at least one of a trusted relationship score, a prioritization score, a productivity metric, and a collaboration metric.

14. The method of claim 1, further including the step of plotting the social network map, wherein a Y-axis is the prioritization score, an X-axis is a size of a bubble (minimum to maximum) established based on at least one of a trust relationship score (two-way or one-way), an electronic communication productivity metric, and an electronic communication collaboration metric.

15. The method of claim 1, further including the steps of:
plotting the social network map, wherein an atomic unit of respective top trusted entities are established for a given contextual keyword or a set of keywords based on at least one of a relationship trust score, an electronic communication productivity metric, and an electronic communication collaboration metric; and
establishing a second level of a network, wherein the respective top trusted entities of each of an entity on a first level of the network is displayed.

16. The method of claim 1, further including the step of removing an-electronic communication from the electronic communication dataset based on at least one of a user selection, keywords contained in the electronic communication, and an exchange of the electronic communication between predetermined entities.

17. The method of claim 1, the establishing a social network step includes analyzing members of the electronic communication dataset that meet predetermined minimum priority scores.

18. The method of claim 1, wherein the two-way trusted relationship score is a weighted average of the one-way trusted relationship score based on a volume of high priority electronic communications exchanged between the two communicating entities.

19. The method of claim 1, further including applying contextual social network feedback from at least one of the two communicating entities to dynamically update at least one of the electronic communication prioritization score and the electronic communication productivity and collaboration metric.

20. The method of claim 1, the establishing an atomic unit of entities step includes analyzing at least one of a relationship trust score, an electronic communication productivity score, and an electronic communication collaboration metric.

* * * * *